(12) United States Patent
Kaplan

(10) Patent No.: US 8,643,652 B2
(45) Date of Patent: Feb. 4, 2014

(54) DYNAMIC AUGMENTATION OF EXTENSIBLE FONT SUBSETS

(75) Inventor: Gregory A. Kaplan, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 624 days.

(21) Appl. No.: 12/872,462

(22) Filed: Aug. 31, 2010

(65) Prior Publication Data

US 2013/0127872 A1    May 23, 2013

(51) Int. Cl.
 G06T 11/00    (2006.01)
 G06T 11/20    (2006.01)
 G09G 5/24    (2006.01)

(52) U.S. Cl.
 CPC ............... *G06T 11/203* (2013.01); *G09G 5/24* (2013.01)
 USPC ........ 345/467; 345/468; 345/469; 345/469.1; 345/470; 345/471; 345/472

(58) Field of Classification Search
 CPC ............................... G06T 11/203; G09G 5/24
 USPC .................................................. 345/467–468
 See application file for complete search history.

(56) References Cited

U.S. PATENT DOCUMENTS

| | | | |
|---|---|---|---|
| 6,065,008 A | 5/2000 | Simon et al. | |
| 6,313,920 B1 | 11/2001 | Dresevic et al. | |
| 7,064,758 B2 | 6/2006 | Chik et al. | |
| 7,155,672 B1 | 12/2006 | Adler et al. | |
| 7,359,902 B2 | 4/2008 | Ornstein et al. | |
| 7,492,365 B2 | 2/2009 | Corbin et al. | |
| 2002/0120654 A1 | 8/2002 | Xu | |
| 2005/0193336 A1 | 9/2005 | Fux et al. | |
| 2005/0273704 A1 | 12/2005 | Dunietz et al. | |
| 2005/0275656 A1 | 12/2005 | Corbin et al. | |
| 2006/0103654 A1* | 5/2006 | Chik et al. ..................... | 345/467 |
| 2006/0278724 A1 | 12/2006 | Walker et al. | |
| 2007/0159646 A1 | 7/2007 | Adelberg et al. | |
| 2008/0028304 A1 | 1/2008 | Levantovsky et al. | |
| 2008/0115046 A1* | 5/2008 | Yamaguchi ................... | 715/201 |
| 2008/0218522 A1 | 9/2008 | Fux et al. | |
| 2010/0283786 A1 | 11/2010 | Opstad et al. | |
| 2013/0120396 A1 | 5/2013 | Kaplan | |

OTHER PUBLICATIONS

U.S. Appl. No. 12/622,201, filed Nov. 19, 2009.
Meyers, Nathan; New Font Technology for X11R6, X Window System Technical Conference, Boston, Jan. 1994, 17 pages.
U.S. Appl. No. 12/710,074, filed Feb. 22, 2010.

(Continued)

*Primary Examiner* — Jin-Cheng Wang
(74) *Attorney, Agent, or Firm* — Wolfe-SBMC

(57) ABSTRACT

A font subset is received that includes one or more glyphs of a master font which has a master ordering that establishes an order of precedence on the glyphs of the master font. When the font subset is received, one or more glyphs already exist in a consecutive sequence in an extensible data structure. In response to receiving the font subset, at least one existing glyph is repositioned in the extensible data structure and each received glyph of the received font subset is positioned in the extensible data structure. The repositioning of the at least one existing glyph and the positioning of each received glyph jointly establish a new consecutive sequential ordering on the glyphs in the extensible data structure, such that the new consecutive sequential ordering preserves on the glyphs in the extensible data structure the order of precedence established by the master ordering.

20 Claims, 8 Drawing Sheets

(56) References Cited

OTHER PUBLICATIONS

"Final Office Action", U.S. Appl. No. 12/622,201, (Nov. 7, 2012), 23 pages.
"Final Office Action", U.S. Appl. No. 12/710,074, (Jun. 18, 2013), 14 pages.
"Non-Final Office Action", U.S. Appl. No. 12/622,201, (Apr. 15, 2013), 17 pages.
"Non-Final Office Action", U.S. Appl. No. 12/622,201, (Jun. 18, 2012), 17 pages.
"Non-Final Office Action", U.S. Appl. No. 12/710,074, (Feb. 6, 2013), 11 pages.
"Final Office Action", U.S. Appl. No. 12/622,201, (Sep. 23, 2013), 19 pages.
"Non-Final Office Action", U.S. Appl. No. 12/710,074, (Oct. 10, 2013), 15 pages.

* cited by examiner

CLIENT 200 empty client glyph ID map

| character | master glyph ID | client font range |
|---|---|---| extensible data structure contents:{ } requested font subset:{b,e,d} for word "bed"

SERVER 210 instructions for client

| character | master glyph ID | master font range |
|---|---|---|
| b | 0062 | 4 |
| d | 0064 | 4 |
| e | 0065 | 4 |

CLIENT 220 client glyph ID map

| character | client glyph ID | client font range |
|---|---|---|
| b | 1 | 0 |
| d | 2 | 0 |
| e | 3 | 0 | extensible data structure contents:{b,e,d} requested font subset:{c,a} for word "cab"

SERVER 230 instructions for client

| character | master glyph ID | master font range |
|---|---|---|
| a | 0061 | 4 |
| c | 0063 | 4 |

*FIG. 2A*

CLIENT 240 client glyph ID map

| character | client glyph ID | client font range |
|---|---|---|
| a | 1 | 0 |
| b | 2 | 0 |
| c | 3 | 0 |
| d | 4 | 0 |
| e | 5 | 0 | requested font subset: {$,4,7,⎵,T} for phrase $47 Tab extensible data structure contents:{a,b,c,d,e}

SERVER 250 instructions for client

| character | master glyph ID | master font range |
|---|---|---|
| ⎵ | 0020 | 0 |
| $ | 0024 | 0 |
| 4 | 0034 | 1 |
| 7 | 0037 | 1 |
| T | 0054 | 3 |

CLIENT 260 client glyph ID map

| character | client glyph ID | client font range |
|---|---|---|
| ⎵ | 1 | 0 |
| $ | 2 | 0 |
| 4 | 3 | 1 |
| 7 | 4 | 1 |
| T | 5 | 2 |
| a | 6 | 3 |
| b | 7 | 3 |
| c | 8 | 3 |
| d | 9 | 3 |
| e | 10 | 3 | extensible data structure contents:{⎵,$,4,7,T,a,b,c,d,e}

*FIG. 2B*

DYNAMIC AUGMENTATION OF EXTENSIBLE FONT SUBSETS

BACKGROUND

Electronic devices that display symbols, applications for displaying the symbols, techniques for acquiring the symbols, and even the symbols themselves are evolving and proliferating. The perennial quest for speed, efficiency, and broadening functionality is presently directed towards the electronic transport, processing, and display of characters from an expanding universe of symbols that are rendered on a growing variety of devices. The formulation of efficient mechanisms for storing, moving, and processing a wide array of fonts must account for constraints on device memory, processing speed, network bandwidth, and the established legacy of font processing software.

Some prior methods for provisioning fonts may seek to overcome storage, processing, bandwidth, and software limitations by abridging the font supply available to a particular device or process. Reducing the reservoir of available characters can have the undesirable effect of limiting a device's capability for properly rendering a diverse assortment of font-based documents.

SUMMARY

The description herein discloses various embodiments of systems and methods for receiving a font subset that includes one or more glyphs of a master font which has a master ordering that establishes an order of precedence on the glyphs of the master font. When the font subset is received, one or more glyphs may already exist in a consecutive sequence in an extensible data structure. In response to receiving the font subset, at least one existing glyph is repositioned in the extensible data structure and each received glyph of the received font subset is positioned in the extensible data structure. The repositioning of the at least one existing glyph and the positioning of each received glyph jointly establish a new consecutive sequential ordering on the glyphs in the extensible data structure, such that the new consecutive sequential ordering preserves on the glyphs in the extensible data structure the order of precedence established by the master ordering.

The description herein further discloses various embodiments of systems and methods for a server computer to provide a font subset to a client device, where the font subset comprises one or more glyphs of a master font, where the master font has a master ordering that establishes an order of precedence for glyphs of the master font. The systems and methods include determining information for repositioning at least one glyph of one or more glyphs already existing in an extensible data structure on the client device, where prior to repositioning, the existing glyphs in the extensible data structure are in a consecutive sequence and in the order of precedence for the master font. The systems and methods also include generating instructions for inserting the one or more glyphs of the font subset into the extensible data structure, where the instructions include the information for repositioning to allow the client to insert the one or more glyphs of the font subset into the extensible data structure in a consecutive sequential order when combined with the one or more previously stored glyphs, such that the consecutive sequential ordering preserves the order of precedence for the master font. The systems and methods call for sending the font subset and the generated instructions to the client device.

BRIEF DESCRIPTION OF THE DRAWINGS

FIGS. 2A-2B constitute a flow chart illustrating one embodiment of mappings used by a client and a server during dynamic augmentation of an extensible font subset.

Figure 1:
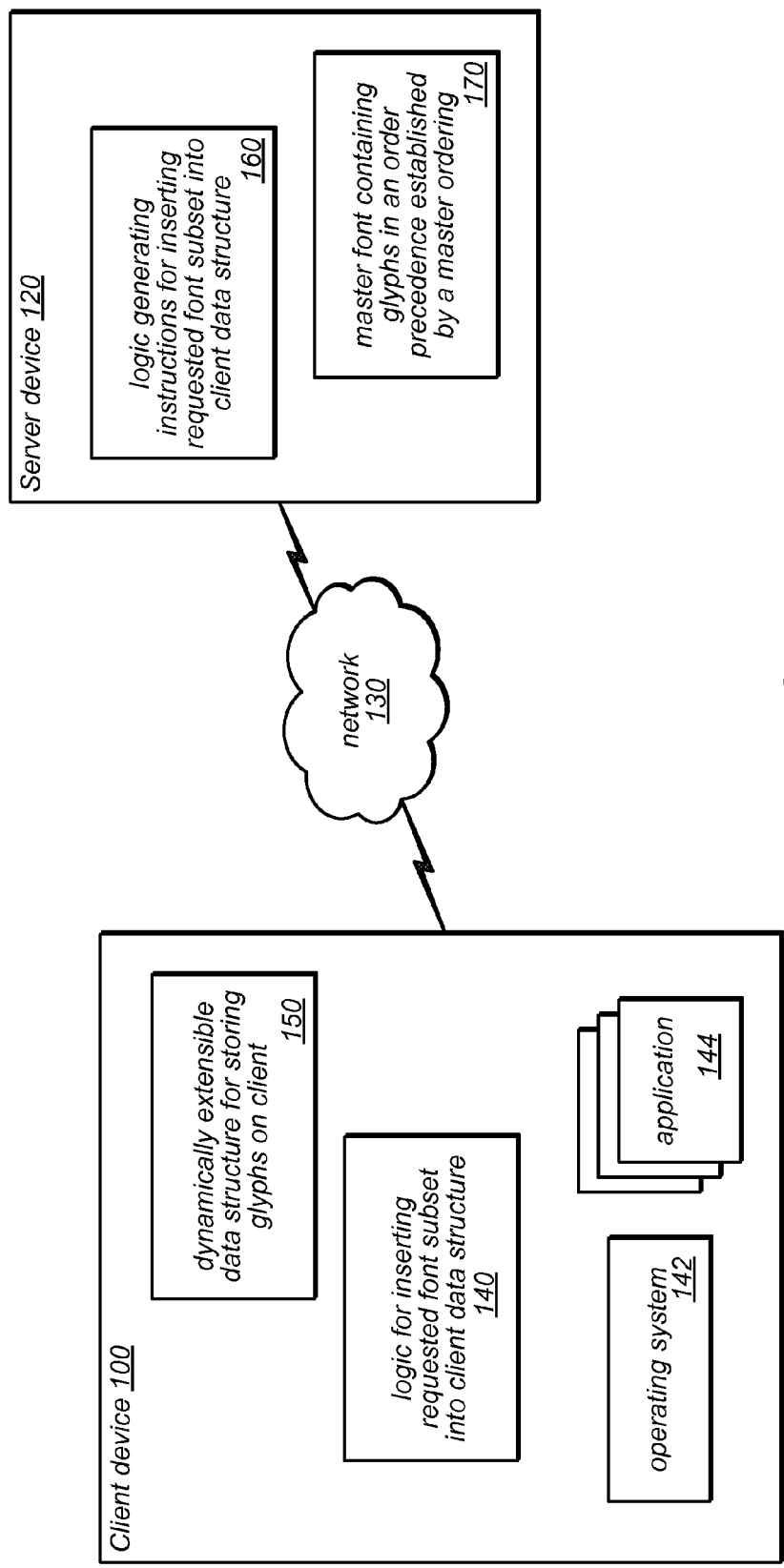
FIG. 1 illustrates one embodiment of a client-server system for dynamic augmentation of extensible font subsets.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for dynamically augmenting extensible font subsets. The systems and methods permit the installation of a partial font into a dynamically extensible data structure for an application, operating system, or other font-using entity running on a client device, such as a computer or smart phone. Additional glyphs or characters of the font may be installed in the extensible data structure as required during the operation of the application, operating system, or other font-using entity running on a client device. Glyphs are the physical shapes which visibly represent characters. The client device may send out multiple requests to a font server or supplier to provide additional glyphs or characters needed in visually rendering documents or other symbol-based display material.

The description herein discloses various embodiments of systems and methods for storing an expandable subset of a font, and for incrementally augmenting the expandable subset dynamically, on an as-needed basis that tailors the expansion of the font subset according to a present need. Newly required characters that may not be presently available to an application running on a client device may be included in a request sent by the client device to a source, such as a server computer, that maintains a master font containing glyphs used in rendering various characters of the master font. The request may be customized to the client's present requirements so that a minimal collection of glyphs sufficient to render the required characters is returned to the client device. Moreover, the client device may embed the newly acquired glyphs into an extensible data structure such that relationships between glyphs stored in the client's extensible data structure reflect corresponding relationships that exist between those same glyphs on the source supplying the glyphs to the client. The source device, such as a remote or local server, or a portion of a system maintaining a master font, may maintain the glyphs of the master font in a distinct ordering relative to each other, according to a master ordering for the master font that establishes an order of precedence on all the glyphs of the master font.

By storing only a partial font on a client device, an application, operating system, or other entity dynamically issuing font requests from the client device may minimize the amount of memory or disk space needed to accommodate the font on the client, and may make efficient use of network resources used in maintaining the partial font in a condition adequate for properly rendering documents displayed on the client. Speed and efficiency are thus optimized for the application, operating system, or other font-using entity running on the client device, and the use of network resources spent in maintaining the partial font may also be optimized. The extensibility of the data structure storing the partial font expands the symbol rendering capacity of an application, operating system, or other font-using entity running on the client device on a continuing, dynamic basis. As the client device's application, operating system, or other font-using entity encounters material whose display of symbols requires characters or glyphs not currently available on the font-using entity, a request for more glyphs or symbols can be sent to a server that maintains a master font.

Character encoding systems pair each character with a fixed number or other means of identification for the character. For example, American Standard Code for Information Interchange (ASCII) and Unicode are character encoding systems. Non-negative integer codes known as code points are used to represent characters. For instance, "A" may be assigned to the integer 0041, and "B" to the integer 0042 under the Unicode system. Glyphs are the physical shapes which visibly represent characters. Glyphs are graphic objects, and are stored as components of a font. For example, g, g, and g are all distinct glyphs used to represent the character whose Unicode value is 0067, namely the Latin small letter "g." The process of going from characters to glyphs is known as shaping or rendering. Code charts that assign code points to characters often display a representative glyph for each character. The character itself is an abstraction identified by the fixed numerical code point, while the glyph is a visual, graphic element used to visibly represent the character. Every glyph in a master font may be identified by its own unique glyph ID, and the glyph IDs may collectively form a simple, consecutive numerical sequence. Glyph IDs identifying nominal glyph representations of certain characters may be mapped to corresponding Unicode values (Unicode code points) for certain characters. For example, the OpenType font format specifies a character-to-glyph mapping table (cmap table) in which glyph IDs are mapped to character codepoints.

Glyphs of a master font stored on the server or other font-supplying entity may bear specific relationships to each other that are given in one or more interrelated font tables or other structures which establish a master ordering of precedence on the entire master font. The elements of the master font may exist under a partial or total ordering determined by a master ordering on the server, thus providing an order of precedence for the glyphs of the master font. Various font-parsing processes invoked by a font-using entity, such as an application or operating system running on the client, may require that glyphs stored on the client be structured and identified to reflect the order of precedence established on the glyphs of the server by the master ordering of the master font. In such situations, the dynamically extensible data structuring of glyphs for the partial font stored on the client is configured to preserve the order of precedence established by the master ordering on the glyphs of the font.

Interaction between the font-requesting entity and the font-supplying entity assures that the glyphs of the partial font stored for the client are identified and structured on the client in compliance with requirements of font parser applications or other font-processing routines that may operate using the client's store of the partial font. Even though the client may store only a partial version of the master font in the client's dynamically extensible data structure, the elements of the partial font may be indexed by consecutive placement or identification within the extensible data structure that avoids or eliminates gaps and that preserves the order of precedence established by the master ordering or master glyph indexing of the font. Logic for correctly inserting requested font subsets into the client data structure may exist on the server, on the client, or on both client and server, or at a separate third entity capable of providing the necessary logic. The insertion logic may shuffle the ordering of glyphs already stored in the client's extensible data structure when a newly-requested font subset is being installed at the client. By means of shuffling the client's indexing of previously-stored glyphs, the client can open positions for glyphs presently awaiting installation, thus assuring that the client's installation of the each font subset complies with the server's installation of the full master font, preserving the relative ordering and interrelationships between the glyphs of the font subset that are established by the master ordering on the server. The rearrangement or re-indexing, when new glyphs are being inserted, of glyphs already stored at the client, together with a correct client placement or indexing of the new glyphs, assures that the client or applications operating on the client can correctly parse and display symbols rendered from the client's store of glyphs.

Dynamic Augmentation of Extensible Font Subsets

Each glyph in an OpenType font is identified by a Glyph ID (GID) unique to that glyph, and the GIDs place the entire collection of glyphs in sequential order. Glyphs may be specified in ranges whose member glyphs are indexed in consecutive sequences. A standard OpenType font cmap (character to glyph mapping) table assigns some of the glyph IDs of glyphs used in representing specific characters to corresponding Unicode values such as character codepoints. The cmap table may not directly map every glyph ID to a Unicode value. For example, ligatures or dynamically assembled diacritics or other such rendering forms may not be directly mapped by the cmap table. Instead, other mappings, such as substitution lookups from a GSUB (glyph substitution) table, may map such GIDs to other GIDs that are represented in the cmap table.

Glyph IDs may therefore be mapped or linked to each other in a sequence that is collectively defined by the interrelated OpenType font tables for the font. Various OpenType font tables, by means of sequential indexing of glyphs and mapping of glyphs to each other, may establish an expected order of precedence on the glyphs in a font. Proper operation of OpenType parsers may depend on processing the glyphs in a font according to an expected order of precedence that correctly reflects inter-glyph relationships contained collectively within various OpenType font table structures for the font.

In a similar manner, other kinds of fonts may store their glyphs in an expected order of precedence. The proper functioning of parsers or other software applications that process the glyphs of a partial font may depend on storing the glyphs of the partial font, which is a proper subset of the master font, in a particular order that maintains inter-glyph relationships established for the master font, thereby preserving an order of precedence established for the master font, and preventing gaps or holes between the glyphs of the partial font.

FIG. 1 illustrates one embodiment of basic components in a system for dynamically augmenting a client's extensible data structure for storing a partial font, that is, for storing on a client a proper subset of a master font that is maintained on a server computer. Client device 100 and server device 120 correspond to computing machines and may, according to various embodiments, correspond to a desktop computer system, a laptop or notebook or netbook computer, a mainframe computer system, a workstation, a network computer, a handheld computing device such as a personal digital assistant, cellular phone, smart phone, media player, combination device, a camera, a set top box, a mobile device, a consumer device, a video game console, a handheld video game device, an application server, a storage device, a peripheral device such as a printer, copy machine, switch, modem, or router, or another type of computing or electronic device. In various embodiments, client device 100 and server device 120 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, touchpad, touch screen, graphics table stylus, pointing stick, light pen, directional pad, eye tracking device, gesture signaling device, or similar input device, and may also include an image scanner or web cam for image or video input. Output systems may variously include a video subsystem including a video monitor or other display device, an audio subsystem, or other types of output devices. In some embodiments, client device 100 and server device 120 may be configured to execute one or more operating systems, such as Microsoft Windows™, Apple MacOS™, Linux™, or any other suitable operating systems. The terms service device 120 and server 120 are used interchangeably throughout this document. Similarly, the terms client device 100 and client 100 are used interchangeably throughout this document.

Server 120 stores one or more master fonts, such as master font 170. In some embodiments, master font 170 may be an OpenType font that includes a variety of font tables. For example, master font 170 may include the cmap table, in which certain ones of the glyph IDs that identify the entire set of the master font's glyphs in numerical sequence are mapped to character codepoints. Here, glyph IDs for glyphs used in representing certain characters are mapped to corresponding Unicode values. Master font 170 may also include optional tables such as GDEF (Glyph definition data), GSUB (Glyph substitution data), GPOS (Glyph positioning data), and so forth. Acting in concert, the master font's tables may map some of the glyph IDs to each other. The various tables of master font 170 refer to the glyphs contained in the master font using the glyph IDs that index the glyphs, uniquely identifying each glyph, and placing the entire set of glyphs into consecutive sequence.

Server 120 may also contain logic 160 for generating instructions that allow the client to correctly insert the glyphs of the requested font subset into the client's dynamically extensible data structure 150, such that the set of all the glyphs stored on the client is consecutively ordered to preserve the order of precedence established by the master ordering of the glyphs of the master font.

Client 100 shown in FIG. 1 may be embodied as a hardware device, such as a personal computer or a handheld electronic device capable of displaying symbols, or as some other device, as described above. An operating system, a software application, or some other font-using entity running on client 100 may require glyphs to be stored on client 100 in order to visual render a proper representation of font symbols. Client 100 includes dynamically extensible data structure 150, which is designed to receive and store glyphs that the client requests and receives from a server such as server 120.

According to some embodiments, client 100 also includes logic 140 for directing the client's own insertion of requested font subsets into the client's dynamically extensible data structure 150. In some embodiments, client logic 140 and server logic 120 may act jointly to accomplish the correct insertion of the requested glyphs into the client's dynamically extensible data structure 150. In other instances, server 120 may not contain logic 160, and client logic 140 may manage all calculations necessary to properly place requested glyphs into the client's dynamically extensible data structure 150. In such an instance, client 100 may have separate access to information describing the master ordering of the glyphs of the master font stored on server 120. In still other cases, server logic 160 may perform all computations needed to generate a complete set of instructions for client 100 to properly insert requested font subsets into the client's dynamically extensible data structure 150, and client logic 140 may simply follow the directions set forth in the instructions determined by server 120.

Client logic 140 may, according to various embodiments, be incorporated into an operating system 142 running on client device 100, or into one or more applications 144 running on client device 100, or may exist on client device 100 separately from operating system 142 and applications 144. Data generated by client logic 140 may, according to some embodiments, be shared with operating system 142 and with applications 144 and with other font-using processes running on client device 100. Client logic 140 may manage the augmentation of dynamically extensible font subsets as required by operating system 142, applications 144, and other font-using processes running on client device 100. According to some embodiments, operating system 142, applications 144, and other font-using processes running on client device 100 may share data contained in the client device's dynamically extensible data structure 150, including glyphs and indexing data representing the order of precedence established by the client on the glyphs stored in extensible data structure 150.

Server 120 may be embodied as a computer that is completely separate and geographically remote from client 100, and that communicates with client 100 via network 130. In other embodiments, client 100 and server 120 may not be geographically remote, but rather may exist as separate components of a local network. In yet other instances, client 100 and server 120 may be two components of a single hardware device or system. According to various embodiments, client 100 and server 120 may run software applications which communicate through network 130.

FIGS. 2A and 2B show an illustrative flow of information exchanged between client 100 and server 120. At 200 of FIG. 2A, client 100's dynamically extensible data structure 150 is empty, and there are no glyphs listed in the client glyph ID map. At this stage, client 100 sends a request to server 120 asking for font data needed to render the word "bed." Client 100 may formulate the request as a request for specific glyphs needed to render the word "bed," or as a request for the characters b, e, and d, and may identify needed Unicode values. According to certain embodiments, client 100 may include the empty client glyph ID map in the request sent to server 200.

At 210 of FIG. 2A, server 120 has received the request sent by client 100. In the illustrated embodiment, the requested characters all belong to master font range 4 on server 120, and are identified by master glyph IDs 0062, 0064, and 0065, respectively. According to some embodiments, server 120 may have received the empty client glyph ID map shown in FIG. 2A, 200, and may determine instructions for client 100 for inserting the requested font subset into extensible data structure 150 on client 100 based upon the knowledge that client 100's dynamically extensible data structure 150 is empty.

For an embodiment in which server 120 does determine instructions for client 100 for inserting the requested characters or glyphs into the client's extensible data structure 150, server 120 may send back to client 100 both the requested characters or glyphs and the determined instructions.

At 220 of FIG. 2A, client 100 inserts the requested glyphs into dynamically extensible data structure 150, basing the insertions on either instructions received from server 120 or on calculations performed by client logic 140 or by a separate third entity capable of performing the needed calculations. Characters b, e, and d, or a collection of glyphs representing b, e, and d, are positioned into extensible data structure 150 and assigned the consecutive client glyph IDs 1, 2, and 3. The client's ordering for b, d, and e leaves no gaps between the glyphs now stored on client 100. Furthermore, b precedes d in both the client glyph ID ordering and in the master glyph ID ordering. Similarly, d precedes e in both the client glyph ID ordering and in the master glyph ID ordering. The order of precedence established by the master glyph ID ordering is thus preserved in the client glyph ID ordering. The client glyph ID ordering and the master glyph ID ordering for b, d, and e are shown in the maps at FIG. 2A, 220 and 210. The client glyph ID sequence is 1, 2, 3, while the master glyph ID sequence is 0062, 0064, and 0065. The client ordering of the requested glyphs by the consecutive sequence 1, 2, 3 is based on the initial complete absence of glyphs in extensible data structure 150, leaving client 100 free to place b, d, and e in positions 1, 2, and 3 of extensible data structure 150. Glyphs with master glyph IDs 0062, 0064, and 0065 may also belong to a master font range 4 in some embodiments, as shown in FIG. 2A, 210. Client 100 may then assign its copies of those glyphs to client font range 0.

At FIG. 2A, 220, client 100 sends another request to server 120, this time for glyphs for the characters "a" and "c" needed to render the word "cab." Depending on the embodiment, in cases for which client 100 depends on server 120 to determine instructions for inserting the requested font subset into extensible data structure 150, client 100 may also send the client glyph ID map shown at FIG. 2A, 220 to server 120. If server 120 does determine instructions for inserting the requested font subset into extensible data structure 150, it may base those instructions on the information contained in the received client glyph ID map. Since the requested glyph with master glyph ID 0061 precedes, in the master glyph ID ordering, all the glyphs already stored in extensible data structure 150, all the glyphs already stored in extensible data structure 150 must be shifted up in the client glyph ID ordering. And, since, in the master glyph ID ordering, the requested glyph with master glyph ID 0063 precedes the glyphs already stored in extensible data structure 150 as client glyphs 2 and 3, then "d" and "e" must be shifted up again in the client glyph ID ordering. The client thus is instructed to reposition the existing glyphs that were previously stored in the extensible data structure at positions 1, 2, and 3. Glyph "b" acquires the new client glyph ID "2," glyph "d" acquires the new client glyph ID "4," and glyph "e" is given the new client glyph ID "5." All three glyphs are thus repositioned within extensible data structure 150 to positions 2, 4, and 5. In addition, glyph "a" is placed into position 1 in extensible data structure 150, acquiring client glyph ID 1, and glyph "c" is placed into position 3 in extensible data structure 150, acquiring client glyph ID 3.

The client glyph ID map shown in FIG. 2B, 240, exhibits the new client glyph IDs for master glyphs 0061-0065. The order of precedence established by the master glyph ID ordering is thus preserved in the client glyph ID ordering of the five glyphs. Since master glyphs 0061-0065 all belong to master font range 4, client 100 may keep its copies of all five glyphs stored in client font range 0. The client glyph ID map shown at FIG. 2B, 240, or information to construct such a map, may be provided to client 100 by server 120 in the instructions that are determined for client 100 by server 120, by client 100 itself, or by a third entity capable of performing the necessary calculations.

At FIG. 2B, 240, client 100 requests glyphs for rendering the symbols "$", "4," "7," ",", and "T." As shown in the table at FIG. 2B, 250, the requested glyphs are distributed among three different master font ranges numbered 0, 1, and 3. Since each of the requested five glyphs precedes each of the glyphs already stored in extensible data structure 150 in the master glyph ID ordering, each of the glyphs already stored in extensible data structure 150 must be shifted to a position 5 units higher, that is, each glyph must be shifted upward one unit for each of the newly-requested glyphs. "a," "b," "c," "d," and "e" thus are repositioned to client locations 6, 7, 8, 9, and 10, respectively, in the client glyph ID ordering. The newly-received glyphs for the symbols "$", "4," "7," ",", and "T" are put into extensible data structure 150 in the same order in which they are indexed by the master glyph ID ordering. In this manner, the 10 glyphs presently stored on client 100 in extensible data structure 150 are positioned consecutively so as to preserve the order of precedence established on the same 10 glyphs by the master glyph ID ordering.

Since the five requested glyphs are distributed among three different master font ranges, each of which precedes the master font range for each of the glyphs already stored in extensible data structure 150, then each of the glyphs already stored in extensible data structure 150 must be elevated upward to a client font range that is three units higher, in order to provide three lower client font ranges to accommodate the five requested glyphs. Master glyphs 0020 and 0024 get assigned to client font range 0. Master glyphs 0034 and 0037 get assigned to client font range 1. Master glyph 0054 is assigned to client font range 2. The existing client copies of master glyphs 0061-0065 are moved upward to client font range 3, and indexed 6-10 in the client glyph ID ordering. In this manner, client 100 preserves for its stored glyphs and for their corresponding client glyph ranges the same the order of precedence established by the master glyph ID ordering and the master font range ordering, with no gaps in either the client glyph ID sequence or the client font range sequencing. See FIG. 2B, 260.

Figure 3:
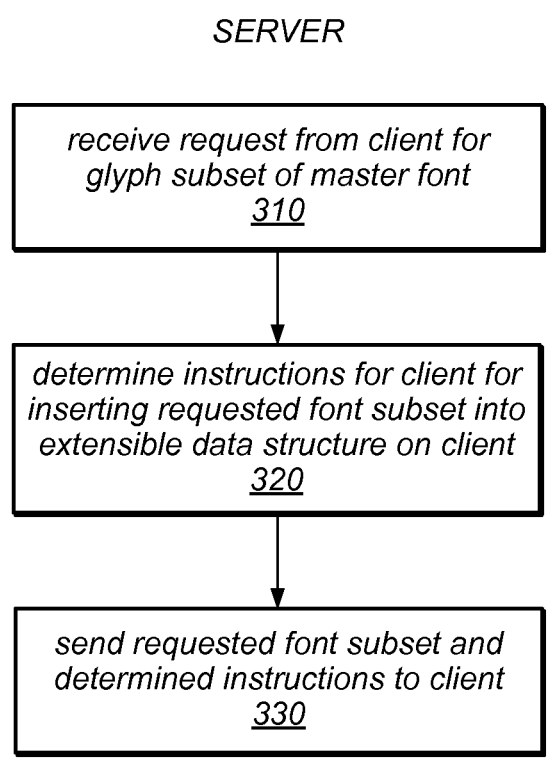
FIG. 3 is a flow chart illustrating one embodiment of principal steps taken by a server in dynamic augmentation of extensible font subsets.

FIG. 3 a flow chart illustrating one embodiment of the main steps taken by server 120 in dynamically augmenting client 100's extensible data structure 150. At block 310, server 120 receives a request from client 100 for a font subset that includes one or more glyphs of a master font maintained on server 120. At block 320, server 120 may determine instructions for client 100 for inserting the requested font subset into extensible data structure 150 on client 100. The instructions determined by server 100 indicate for client 100 information that is used by client 100 in repositioning at least one glyph of one or more glyphs that were previously stored in extensible data structure 150, where the one or more glyphs were previously stored in extensible data structure 150 in a consecutive sequence preserving the order of precedence established by the master glyph ordering. The information is also used by client 100 in positioning each glyph of the requested font subset in extensible data structure 150. The repositioning of the previously stored glyphs, and the positioning of each glyph of the requested font subset, function to jointly establish in the client a consecutive sequential glyph ordering that preserves the order of precedence established by the master ordering on the glyphs now currently stored on client 100.

At block 330, server 120 sends the requested font subset and the determined instructions to client 100. In embodiments for which client 100 has separate access to information describing the master ordering of the glyphs of the master font stored on server 120, server 120 may send only the requested glyphs.

Figure 4:
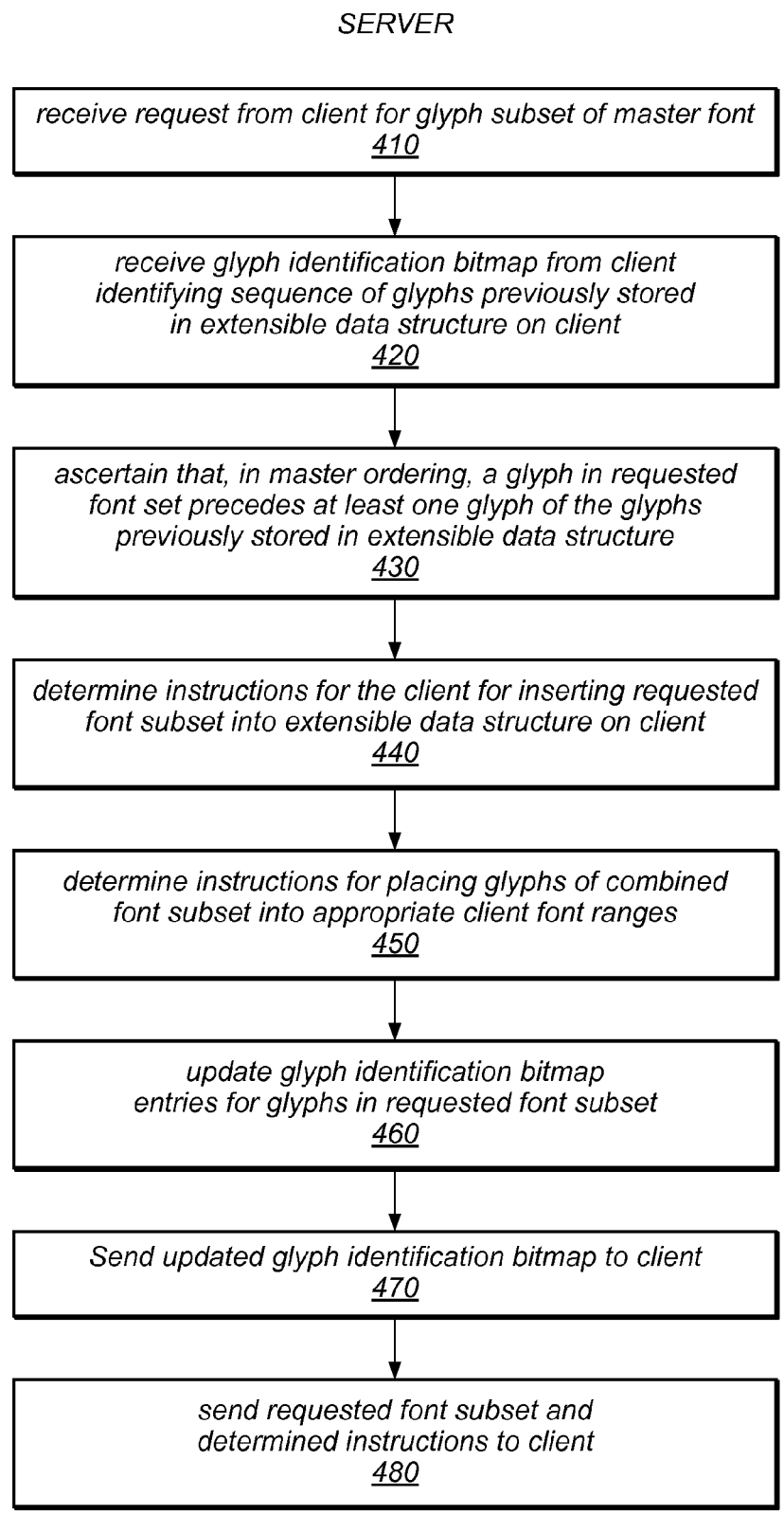
FIG. 4 is a flow chart illustrating one embodiment of principal and intermediate steps taken by a server during a dynamic augmentation of an extensible font subset.

FIG. 4 is a flow chart illustrating one embodiment of principal and intermediate steps taken by server 100 during dynamic augmentation of an extensible font subset stored on client 100. At block 410, server 100 receives a request from client 100 for a font subset that includes one or more glyphs of a master font maintained on server 100. At block 420, server 120 receives a glyph identification bitmap from client 100 that identifies glyphs previously stored on the client in extensible data structure 150. According to some embodiments, server 120 may not receive such a client bitmap; information allowing server 120 to describe the client glyph ID ordering and the distribution of client font ranges may not be necessary if client 100 has its own access to information describing the master glyph ID ordering of the glyphs of the master font stored on server 120, and describing the master font range ordering. In such cases, logic situated either on client 100 or on a third entity may be sufficient to determine the necessary repositioning of glyphs already existing within extensible data structure 150, the proper placement of newly received glyphs into extensible data structure 150, and the correct assignment of client font range numbers to the glyphs stored in extensible data structure 150.

In some embodiments, the glyphs of the master font may be arranged on server 120 according to a master glyph ID ordering that does not depend on partitioning the glyphs into a plurality of master font ranges. Other embodiments of a master font may partition the glyphs of the master font into a plurality of master font ranges ranked in an order of precedence established by a master font range ordering. For such embodiments, glyphs previously stored in extensible data structure 150 may also be partitioned into one or more existing client font ranges consecutively enumerated to preserve the order of precedence established by the master font range ordering, such that each of the one or more existing client font ranges corresponds to one of the plurality of master font ranges that contains each glyph in the existing client font range.

In some embodiments for which server 120 is expected to determine instructions directing client 100's insertion of the requested font subset into extensible data structure 150, server 120 may perform the action shown in block 430 of FIG. 4, ascertaining that, in the master glyph ordering, a glyph in the requested font set precedes at least one glyph of the one or more glyphs previously stored in extensible data structure 150. In response to this ascertainment, server 120 may include information in the determined instructions for repositioning the at least one glyph upward to a higher position within the sequence of glyph placement positions in extensible data structure 150. As shown in the example illustrated in FIGS. 2A-2B, a previously stored glyph may move upward one unit per newly-received glyph which precedes the previously stored glyph in the master glyph ordering.

In like manner, as also exemplified in FIGS. 2A-2B, previously stored glyphs may be reassigned to newly-established, higher client font ranges. For example, a newly-acquired glyph may belong to a particular master font range that does not currently correspond to an existing client font range. In case the particular master font range containing the newly-acquired glyph precedes a certain master font range which currently corresponds to a certain client font range, the certain client font range may be emptied of all glyphs previously stored within it. A new client font range with higher index may be established to contain the glyphs removed from the certain font range. The newly-acquired glyph, and any other glyphs received from the server that belong to the particular master font range may be assigned to the empty certain client font range. Upon completion of the distribution of the previously stored and newly-acquired glyphs into their appropriate client font ranges, the collection of all currently existing client font ranges will have been consecutively indexed to preserve the order of precedence, under the master font range ordering, on the master font ranges.

In some instances, newly-acquired glyphs may each belong to a master font range corresponding to one of the one or more existing client font ranges. Here, each given glyph in the combined font subset gotten by joining the previously stored glyphs with the requested glyphs may be placed in the appropriate existing client font range whose corresponding master font range contains the given glyph. In such instances, the repositioning of glyphs already stored in extensible data structure 150 and the placement of newly-acquired glyphs into extensible data structure 150 may be accomplished without altering the consecutive enumeration of the one or more existing client font ranges.

On the other hand, there may also be instances in which client 100 establishes one or more new client font ranges. As described above, each such new client font range corresponds to a master font range containing a glyph of the requested font set that is not contained in any of the one or more master font ranges that correspond to the one or more existing client font ranges. The calculations for establishing the one or more new client font ranges may be performed either by server 120, by client 100, or by a separate third entity, depending on the embodiment. Calculations are also performed to enable client 100 to consecutively enumerate the combined set of client font ranges defined as the union of the set of all existing client font ranges with the set of all newly-established client font ranges. The consecutive enumeration of this combined set of client font ranges is calculated to preserve the order of precedence established by the master font range ordering.

Block 440 of FIG. 4 signifies action by server 120 to determine instructions containing information needed by client 100 to properly insert the one or more glyphs of the requested font subset into extensible data structure 150 on client 100. Such information may also be determined, in some embodiments, by client 100 itself, instead of by server 120. In other embodiments, a third entity separate from client 100 and from server 120 may generate the necessary information for client 100. The information is used by client 100 in repositioning at least one glyph of one or more glyphs that were previously stored in extensible data structure 150, where the one or more glyphs were previously stored in extensible data structure 150 in a consecutive sequence that preserved the order of precedence established by the master glyph ordering. The information is also used by client 100 in positioning each glyph of the requested font subset in extensible data structure 150. The repositioning of the previously stored glyphs, and the positioning of each glyph of the requested font subset, function to jointly establish a consecutive sequential ordering that preserves the order of precedence established by the master ordering on the glyphs now currently stored on client 100.

Block 450 of FIG. 4 indicates action performed by server 120 to determine instructions containing information for client 100 for placing each of the glyphs of the combined font subset into the client font range whose corresponding master font range contains the glyph. In some instances, server 120 may have already ascertained that at least one of the one or more existing client font ranges currently corresponds to a master font range which, in the master font range ordering, is preceded by another master font range that contains a glyph of the requested font set that is not contained in any of the one or more master font ranges corresponding to the one or more existing client font ranges. In response to such an ascertainment, server 120 may indicate in the information for client 100 that the consecutive enumeration of the combined set of client font ranges shifts the at least one of the one or more existing client font ranges to a higher position in the client font range indexing. FIGS. 2A-2B, as described above, illustrate an example of such an embodiment. The information needed by client 100 for placing each of the glyphs of the combined font subset into the client font range whose corresponding master font range contains the glyph may, according to other embodiments, be determined by client 100 itself, or by a third entity separate from client 100 and from server 120.

Block 460 of FIG. 4 indicates an updating of the glyph identification bitmap that is variously performed, according to various embodiments, by server 120, by client 100, or by a third separate entity. Here, one or more entries in client 100's glyph identification bitmap, corresponding to one or more glyphs in the requested font subset, are updated to indicate that client 100 is currently in possession of the newly-acquired glyphs of the requested font subset. The updated glyph identification bitmap may be used by client 100 and by server 120 in subsequent mutual transactions. For example, client 100 may avoid repeating a request for any glyph which it already possesses, as indicated in the updated glyph identification bitmap. Server 120 may, as indicated at block 420 of FIG. 4, and according to some embodiments, receive in the client's request a copy of client 100's current glyph identification bitmap. Server 120 may determine the instructions for client 100 for inserting the requested font subset into extensible data structure 150 based upon knowledge of which glyphs are already in possession of client 100, as indicated in the copy of client 100's current glyph identification bitmap.

Server 120 may, according to some embodiments, send to client 100 the updated version of the glyph identification bitmap that indicates each glyph contained in the received requested font subset, as shown at block 470 of FIG. 4. As shown at block 480 of FIG. 4, Server 120 sends client 100 the one or more glyphs for the font subset requested by client 100. For some embodiments, server 120 also sends the determined instructions to client 100 to guide client 100 in inserting the requested font subset into extensible data structure 150, as described above.

Figure 5:
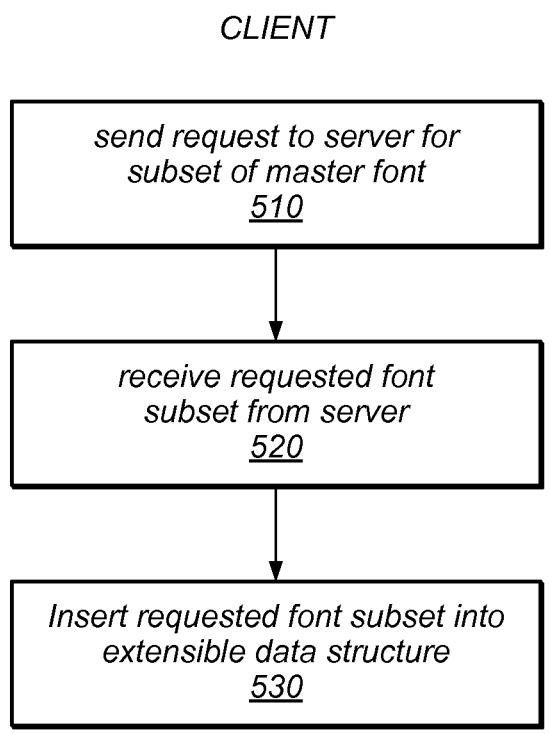
FIG. 5 is a flow chart illustrating one embodiment of principal steps taken by a client in dynamic augmentation of an extensible font subset.

FIG. 5 illustrates one embodiment of principal steps taken by client 100 during dynamic augmentation of extensible font subset 150. At block 510, client 100 sends a request to server 120 for a font subset comprising one or more glyphs of a master font maintained on server 120 under a master ordering that establishes an order of precedence on the glyphs of the master font. At block 520, client 100 receives from server 120 one or more glyphs of the requested font subset. At block 530, client 100 inserts the requested font subset into extensible data structure 150.

Figure 6:
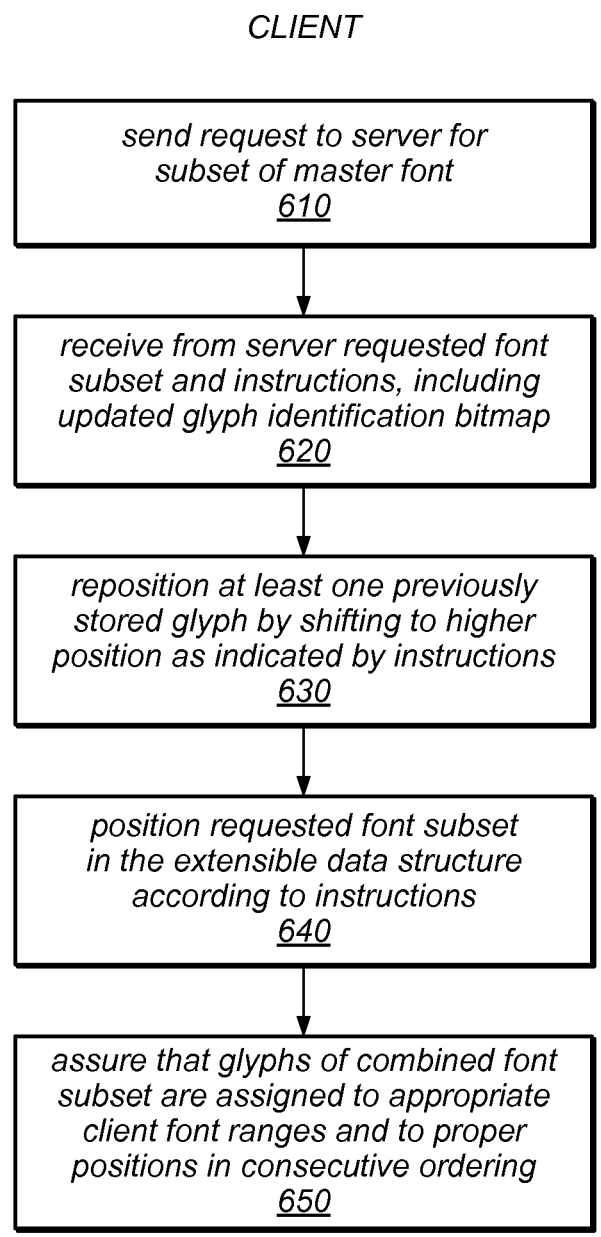
FIG. 6 is a flow chart illustrating one embodiment of principal and intermediate steps taken by a client during a dynamic augmentation of an extensible font subset.

FIG. 6 illustrates one embodiment of principal and intermediate steps taken by client 100 during dynamic augmentation of extensible font subset 150. The action indicated in FIG. 6 may correspond to actions contained in the description of server 120 given above. Block 610 of FIG. 6 corresponds to block 510 of FIG. 5, indicating that client 100 sends a request to server 120 for a font subset comprising one or more glyphs of a master font maintained on server 120 under a master ordering that establishes an order of precedence on the glyphs of the master font. At block 620, client 100 receives from server 120 one or more glyphs of the requested font subset. For embodiments in which server 120 determines instructions for guiding client 100 in inserting the requested font subset into extensible data structure 150, client 100 may also receive the determined instructions from server 120, as indicated at block 620. In some instances, client 100 may have included in its request to server 120 a copy of client 100's glyph identification bitmap. Server 120 may return an updated copy of the glyph identification bitmap to client 100, as indicated at block 620, and explained in the description of server 120 given in the preceding paragraphs.

Based either upon instructions received from server 120, or upon its own calculations, or upon calculations performed by a third entity, client 100 repositions at least one glyph of one or more glyphs previously stored in extensible data structure 150, where the one or more glyphs were previously stored in extensible data structure 150 in a consecutive sequence to preserve the order of precedence established by the master ordering. See block 630, FIG. 6. Client 100 also positions each newly-received glyph of the requested font subset into extensible data structure 150, as indicated at block 640. The repositioning and the positioning are performed by client 100 so that they jointly establish a consecutive sequential ordering on the glyphs of a combined font subset comprising the one or more previously stored glyphs and the requested font subset, such that the consecutive sequential ordering preserves the order of precedence established by the master glyph ordering on the glyphs of the combined font subset.

According to some embodiments, client 100's repositioning of the at least one glyph of one or more glyphs previously stored in extensible data structure 150 is performed after ascertaining that, in the master ordering, a glyph in the requested font set precedes the at least one glyph of the one or more glyphs previously stored in extensible data structure 150, and the repositioning responsively shifts the at least one glyph of the one or more glyphs previously stored in extensible data structure 150 to a higher position in extensible data structure 150.

For embodiments in which the glyphs of the master font are partitioned into a plurality of master font ranges that are ranked in an order of precedence established by a master font range ordering, as indicated at block 650, client 100 also assures that glyphs of the combined font set are assigned to appropriate client font ranges. In some instances, client 100 may ascertain that at least one of the one or more existing client font ranges currently corresponds to a master font range which, in the master font range ordering, is preceded by another master font range that contains a glyph of the requested font set that is not contained in any of the one or more master font ranges corresponding to the one or more existing client font ranges. In response to such an ascertainment, client 100 may then establish one or more new client font ranges, where each of the one or more new client font ranges corresponds to one of the plurality of master font ranges containing a glyph of the requested font set that is not contained in any of the one or more master font ranges corresponding to the one or more existing client font ranges. Client 100 may consecutively enumerate a combined set of client font ranges consisting of the one or more new client font ranges and the one or more existing client font ranges, and the consecutive enumeration of the combined set may shift the at least one of the one or more existing client font ranges to a higher position in the client font range indexing, while preserving the order of precedence established by the master font range ordering. Client 100 may place each of the glyphs of the combined font subset in the client font range whose corresponding master font range contains the glyph.

Requests sent by client 100 may, in some embodiments, specify actual Unicode values for the requested font subset, and may depend on server 120 to determine, via a cmap table, or some other mapping, which glyphs of the master font should be returned to client 100.

Exemplary Computer System

Figure 7:
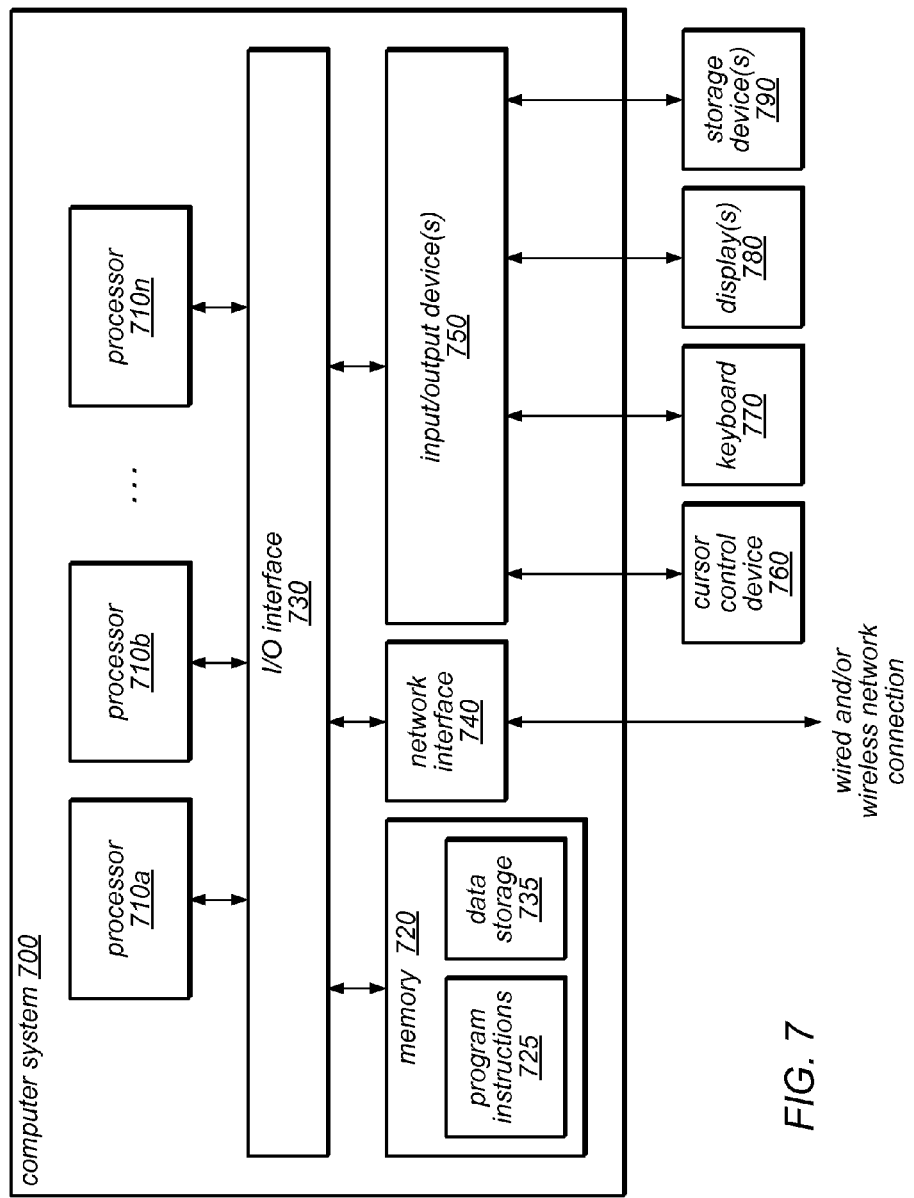
FIG. 7 is a block diagram illustrating an embodiment of a computer system.

FIG. 7 illustrates one embodiment of an architecture that may be configured to implement any or all of the various features of the systems illustrated in FIGS. 1-9. In particular, program instructions 725 may be configured to perform any or all of the various features of the systems and methods described in the foregoing paragraphs. For example, program instructions 725 may be configured to dynamically augment extensible font subsets, as described in the foregoing paragraphs. It is noted that across a range of embodiments, functions of programming instructions 725 may be implemented in hardware, in software, or in a combination of software and hardware.

Generally speaking, computer system 700 illustrated in FIG. 7 may correspond to any suitable type of computer system configured to execute applications. For example, computer system 700 may correspond to a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device. In various embodiments, computer system 700 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, touchpad, touch screen, graphics table stylus, pointing stick, light pen, directional pad, eye tracking device, gesture signaling device, or similar input device, and may also include an image scanner or web cam for image or video input. Output systems may variously include a video subsystem including a video monitor or other display device, an audio subsystem, or other types of output devices. In some embodiments, computer system 700 may be configured to execute one or more operating systems, such as Microsoft Windows™, Apple MacOS™, Linux™, or any other suitable operating systems.

It is contemplated that in some embodiments, any of the methods, techniques or components described above may be implemented as instructions and data capable of being stored or conveyed via a non-transitory computer-accessible medium. Such methods or techniques may include, for example and without limitation, any of the various methods already described for dynamically augmenting extensible font subsets. In particular, client logic 140 and server logic 160 or any partition of their functions may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

One exemplary embodiment of a computer system including tangible, computer-accessible storage media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. In different embodiments, system 700 may be variously configured as a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as program instructions 725 and data storage 735. It is noted that in some embodiments, program instructions 725 may include instructions and data implementing desired functions that are not directly executable by processor 710 but are represented or encoded in an abstract form that is translatable to instructions that are directly executable by processor 710. For example, program instructions 725 may include instructions specified in an ISA that may be emulated by processor 710, or by other code executable on processor 710. Alternatively, program instructions 725 may include instructions, procedures or statements implemented in an abstract programming language that may be compiled or interpreted in the course of execution. As non-limiting examples, program instructions 725 may include code specified in a procedural or object-oriented programming language such as C or C++, a scripting language such as Perl or Ruby or Python, a markup language such as HTML or XML, or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functioning of I/O interface 730, such as an interface to system memory 720, may be incorporated directly into processor 710.

Network interface 740 may be configured to allow data to be exchanged between computer system 700 and other devices attached to a network, such as other computer systems or communications devices, for example. In particular, network interface 740 may be configured to allow communication between computer system 700 and various external devices. These external devices may include various computing and communications devices, which may include elements similar to those of computer system 700. In particular, the external devices may include personal computers, telephony devices or network-attached computing devices that users may employ to access network services. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a tangible, non-transitory computer-accessible storage medium configured to store instructions and data as described above. However, in other embodiments, instructions and/or data may be stored upon and retrieved from different types of computer-accessible storage media. Generally speaking, a non-transitory computer-accessible medium may include storage media or memory media such as magnetic or optical media, e.g., disk or CD/DVD-ROM coupled to computer system 700 via I/O interface 730. A non-transitory computer-accessible medium may also include any volatile or non-volatile media such as RAM (e.g. SDRAM, DDR SDRAM, RDRAM, SRAM, etc.), ROM, etc, that may be included in some embodiments of computer system 700 as system memory 720 or another type of memory. A non-transitory computer-accessible medium may generally be accessible via transmission media or signals such as electrical, electromagnetic, or digital signals, which may be conveyed via a communication medium such as a network and/or a wireless link, such as may be accessed via network interface 740.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
receiving, using a client device, a font subset comprising one or more glyphs of a master font having a master ordering that establishes an order of precedence on the glyphs of the master font;
in response to said receiving, using the client device to reposition, in an extensible data structure, at least one glyph of one or more existing glyphs already in the extensible data structure, wherein prior to repositioning, the one or more existing glyphs are in a consecutive sequence in the extensible data structure to preserve the order of precedence established by the master ordering; and
positioning, using the client device, each received glyph of the received font subset in the extensible data structure, wherein repositioning said at least one glyph and said positioning jointly establish a new consecutive sequential ordering on the glyphs of a combined font subset comprising the one or more existing glyphs and the one or more received glyphs of the received font subset, such that the new consecutive sequential ordering preserves, on the glyphs of the combined font subset, the order of precedence established by the master ordering.

2. The method of claim 1, further comprising:
prior to said receiving, sending a request to a server computer for the font subset, wherein the request includes a glyph identification bitmap that identifies the consecutive sequence of the one or more glyphs already in the extensible data structure, wherein the font subset is received from the server computer in response to the request; and
receiving from the server computer an updated version of the glyph identification bitmap that indicates each glyph contained in the received requested font subset.

3. The method of claim 2, wherein the request specifies Unicode values for the requested font subset.

4. The method of claim 1, further comprising:
determining that, in the master ordering, a glyph in the received font subset precedes the at least one glyph of the one or more existing glyphs already in the extensible data structure; and
in response to said determining, said using the client device to reposition shifts the at least one glyph of the one or more existing glyphs already in the extensible data structure to a higher position in the extensible data structure.

5. The method of claim 1, wherein the glyphs of the master font are partitioned into a plurality of master font ranges ranked in an order of precedence established by a master font range ordering, and wherein the one or more existing glyphs already in the extensible data structure are partitioned into one or more existing client font ranges consecutively enumerated to preserve the order of precedence established by the master font range ordering, wherein each of the one or more existing client font ranges corresponds to one of the plurality of master font ranges that contains each glyph in the existing client font range, the method further comprising:
determining that at least one of the one or more existing client font ranges corresponds to a master font range which, in the master font range ordering, is preceded by another master font range containing a glyph of the requested font subset that is not contained in any of the one or more master font ranges corresponding to the one or more existing client font ranges, and in response to said determining:
establishing one or more new client font ranges, wherein each of the one or more new client font ranges corresponds to one of the plurality of master font ranges containing a glyph of the requested font set that is not contained in any of the one or more master font ranges corresponding to the one or more existing client font ranges;
consecutively enumerating a combined set of client font ranges comprising the one or more new client font ranges and the one or more existing client font ranges, wherein said consecutively enumerating the combined set shifts the at least one of the one or more existing client font ranges to a higher position while preserving the order of precedence established by the master font range ordering; and
placing each of the glyphs of the combined font subset in the client font range whose corresponding master font range contains the glyph.

6. A method performed by a server computer to provide a font subset to a client device, wherein the font subset comprises one or more glyphs of a master font, wherein the master font has a master ordering that establishes an order of precedence for glyphs of the master font, the method comprising:
determining information for repositioning in an extensible data structure on the client device at least one glyph of one or more existing glyphs already in the extensible data structure, wherein prior to said repositioning, the one or more existing glyphs are arranged in a consecutive sequence in the extensible data structure;
generating instructions for inserting the one or more glyphs of the font subset into the extensible data structure, wherein the instructions include said information for repositioning to allow the client device to insert the one or more glyphs of the font subset into the extensible data structure such that the one or more existing glyphs and the one or more glyphs of the font subset are arranged in a new consecutive sequential ordering that preserves the order of precedence established by the master ordering; and
sending the font subset and the generated instructions to the client device.

7. The method of claim 6, further comprising receiving a request from the client device for the font subset, wherein the request from the client device identifies the one or more existing glyphs already arranged in the consecutive sequence in the extensible data structure.

8. The method of claim 7, wherein the request from the client specifies Unicode values for the requested font subset.

9. The method of claim 7, wherein the request from the client device includes a glyph identification bitmap that identifies the one or more existing glyphs already arranged in the consecutive sequence in the extensible data structure.

10. The method of claim 9, further comprising updating one or more entries in the glyph identification bitmap corresponding to the one or more glyphs in the requested font subset sent to the client device.

11. The method of claim 10, further comprising sending the updated glyph identification bitmap to the client device.

12. The method of claim 6, further comprising:
determining that, in the master ordering, a glyph in the font subset precedes the at least one glyph of the one or more existing glyphs already in the extensible data structure; and
in response to said determining, indicating in said information for repositioning that said repositioning shifts the at least one glyph of the one or more existing glyphs in the extensible data structure to a higher position in the extensible data structure.

13. The method of claim 6, wherein:
the glyphs of the master font are partitioned into a plurality of master font ranges ranked in an order of precedence established by a master font range ordering; and
the one or more existing glyphs already in the extensible data structure are partitioned into one or more existing client font ranges consecutively enumerated to preserve the order of precedence established by the master font range ordering, wherein each of the one or more existing client font ranges corresponds to one of the plurality of master font ranges that contains each glyph in the existing client font range.

14. The method of claim 13, wherein:
each glyph in the font subset belongs to one of the plurality of master font ranges that corresponds to one of the one or more existing client font ranges;
said inserting does not alter the consecutive enumeration of the one or more existing client font ranges; and
the generated instructions include instructions for placing each of the one or more glyphs of the font subset and each of the one or more existing glyphs already in the extensible data structure in the client font range whose corresponding master font range contains the glyph.

15. The method of claim 13, wherein the generated instructions include instructions for:
establishing one or more new client font ranges, wherein each of the one or more new client font ranges corresponds to one of the plurality of master font ranges containing a glyph of the font subset that is not contained in any of the one or more master font ranges corresponding to the one or more existing client font ranges;
consecutively enumerating a combined set of client font ranges comprising the one or more new client font ranges and the one or more existing client font ranges, wherein said consecutively enumerating the combined set of client font ranges preserves the order of precedence established by the master font range ordering; and
placing each of the glyphs in the extensible data structure in the client font range whose corresponding master font range contains the glyph.

16. The method of claim 15, further comprising:
determining that at least one of the one or more existing client font ranges corresponds to a master font range which, in the master font range ordering, is preceded by a master font range corresponding to one of the one or more new client font ranges; and
in response to said determining, indicating in the generated instructions that said consecutively enumerating the combined set of client font ranges shifts the at least one of the one or more existing client font ranges to a higher position.

17. A system, comprising:
a processor; and
a memory coupled to the processor, wherein the memory stores program instructions for:
receiving, using a client device, a font subset comprising one or more glyphs of a master font having a master ordering that establishes an order of precedence on the glyphs of the master font;
in response to said receiving, repositioning in an extensible data structure on the client device at least one glyph of one or more existing glyphs already in the extensible data structure, wherein prior to said repositioning, the one or more existing glyphs are in a consecutive sequence in the extensible data structure to preserve the order of precedence established by the master ordering; and
positioning, using the client device, each received glyph of the received font subset in the extensible data structure, wherein said repositioning and said positioning jointly establish a new consecutive sequential ordering on the glyphs of a combined font subset comprising the one or more existing glyphs and the one or more received glyphs of the received font subset, such that the new consecutive sequential ordering preserves, on the glyphs of the combined font subset, the order of precedence established by the master ordering.

18. The system of claim 17, wherein said repositioning shifts the at least one glyph of the one or more existing glyphs already in the extensible data structure to a higher position in the extensible data structure when, in the master ordering, a glyph in the font subset precedes the at least one glyph of the one or more existing glyphs already in the extensible data structure.

19. A non-transitory computer-readable storage medium storing instructions for:
receiving a font subset, using a client device, comprising one or more glyphs of a master font having a master ordering that establishes an order of precedence on the glyphs of the master font;
in response to said receiving, repositioning in an extensible data structure on the client device at least one glyph of one or more existing glyphs already in the extensible data structure, wherein prior to said repositioning, the one or more existing glyphs are in a consecutive sequence in the extensible data structure to preserve the order of precedence established by the master ordering; and
positioning, using the client device, each received glyph of the received font subset in the extensible data structure, wherein said repositioning and said positioning jointly establish a new consecutive sequential ordering on the glyphs of a combined font subset comprising the one or more existing glyphs and the one or more received glyphs of the received font subset, such that the new consecutive sequential ordering preserves, on the glyphs of the combined font subset, the order of precedence established by the master ordering.

20. The non-transitory computer-readable storage medium of claim 19, wherein said repositioning shifts the at least one glyph of the one or more existing glyphs already in the extensible data structure to a higher position in the extensible data structure when, in the master ordering, a glyph in the font subset precedes the at least one glyph of the one or more existing glyphs already in the extensible data structure.

* * * * *